(12) United States Patent
Aldridge

(10) Patent No.: US 7,523,401 B1
(45) Date of Patent: Apr. 21, 2009

(54) SYSTEM AND METHOD FOR PROVIDING A BROWSER-BASED USER INTERFACE

(75) Inventor: Gregory E. Aldridge, Kokomo, IN (US)

(73) Assignee: Theoris Software, LLC, Indianapolis, IN (US)

( * ) Notice: Subject to any disclaimer, the term of this patent is extended or adjusted under 35 U.S.C. 154(b) by 987 days.

(21) Appl. No.: 10/783,891

(22) Filed: Feb. 20, 2004

Related U.S. Application Data

(60) Provisional application No. 60/499,751, filed on Sep. 3, 2003.

(51) Int. Cl.
*G06F 3/00* (2006.01)
*G06F 3/14* (2006.01)
*G06F 15/16* (2006.01)

(52) U.S. Cl. ........................ 715/760; 715/765; 715/781; 715/749; 715/205; 715/234

(58) Field of Classification Search ................. 715/733, 715/738, 741–744, 749, 760, 764, 765, 781, 715/866, 500, 501.1, 513, 910, 200, 205, 715/234

See application file for complete search history.

(56) References Cited

U.S. PATENT DOCUMENTS

| | | | | |
|---|---|---|---|---|
| 5,892,905 | A * | 4/1999 | Brandt et al. | 726/11 |
| 6,133,916 | A * | 10/2000 | Bukszar et al. | 715/744 |
| 6,211,877 | B1 * | 4/2001 | Steele et al. | 715/804 |
| 6,415,316 | B1 * | 7/2002 | Van Der Meer | 709/203 |
| 6,622,168 | B1 * | 9/2003 | Datta | 709/219 |
| 6,654,784 | B1 * | 11/2003 | Wei | 709/203 |
| 6,873,984 | B1 * | 3/2005 | Campos et al. | 707/6 |
| 7,185,274 | B1 * | 2/2007 | Rubin et al. | 715/205 |
| 7,246,324 | B2 * | 7/2007 | Mikhail et al. | 715/760 |

(Continued)

FOREIGN PATENT DOCUMENTS

WO   WO 00/34859   6/2000

(Continued)

OTHER PUBLICATIONS

"The WebFace Advantage," Vultus, Inc., 2002.

(Continued)

*Primary Examiner*—X. L Bautista
(74) *Attorney, Agent, or Firm*—Woodard, Emhardt, Moriaty, McNett & Henry LLP

(57) ABSTRACT

A computer system and method is disclosed that provides a single-page zero-footprint browser-based user interface with rich user interface features more commonly found in a traditional client-server application. The system and method includes one or more web servers, reporting servers, relational database servers, data warehouse servers, and client workstations for providing the browser-based application. A user requests that the browser-based application be retrieved from a server. A single page is received from the web server that contains code for a user interface for the application. The user interface with multiple content windows is displayed to a user. When at least one piece of data needs to be retrieved from a data source, an asynchronous request is sent to the server for the data from a hidden frame in the page. The data is received from the server and used in the application. Other requests for data are also made asynchronously.

18 Claims, 7 Drawing Sheets

U.S. PATENT DOCUMENTS

| | | | |
|---|---|---|---|
| 2002/0029243 A1* | 3/2002 | Melet et al. ................ | 709/203 |
| 2002/0052954 A1 | 5/2002 | Polizzi et al. | |
| 2002/0065851 A1* | 5/2002 | Watson et al. ............... | 707/513 |
| 2002/0075297 A1 | 6/2002 | Boulter | |
| 2002/0089536 A1* | 7/2002 | Dang ......................... | 345/749 |
| 2002/0118226 A1 | 8/2002 | Hough et al. | |
| 2002/0129096 A1 | 9/2002 | Mansour et al. | |
| 2002/0188473 A1 | 12/2002 | Jackson | |
| 2003/0023670 A1 | 1/2003 | Walrath | |
| 2003/0048286 A1 | 3/2003 | Lal | |
| 2004/0054968 A1* | 3/2004 | Savage ....................... | 715/513 |
| 2005/0050301 A1* | 3/2005 | Whittle et al. ................ | 712/32 |

FOREIGN PATENT DOCUMENTS

| | | |
|---|---|---|
| WO | WO 02/102097 A1 | 12/2002 |
| WO | WO 03/005184 A2 | 1/2003 |

OTHER PUBLICATIONS

Galli, M., Soares, R., Oeschger, I., "Inner-Browsing: Extending Web Browsing the Navigation Paradigm," http://devedge.netscape.com/viewsource/2003/inner-browsing, May 16, 2003, pp. 1-7.

"Single Page Web Sites," http://www.aspalliance.com/mbrink1111/SinglePage.asp, Aug. 4, 2003, pp. 1-4.

"Remote Scripting and PixieWeb," http://www.pixieware.com/remotescripting.htm, Aug. 4, 2003, pp. 1-3.

"WebFace Studio," Vultus, Inc., http://www.vultus.com/products/webface_studio.html.

* cited by examiner

Fig. 7

SYSTEM AND METHOD FOR PROVIDING A BROWSER-BASED USER INTERFACE

CROSS REFERENCE TO RELATED APPLICATIONS

This application claims the benefit of U.S. Provisional Application No. 60/499,751, filed Sep. 3, 2003.

BACKGROUND OF THE INVENTION

The present invention relates to computer software, and more particularly, but not exclusively, relates to providing a browser-based application.

Traditional Internet applications are structured as a series of hyperlinked documents, which may or may not be generated dynamically. Such applications typically differ substantially from client-server applications in that the user interface is generated by the web server and transmitted to the web browser on the client for rendering. This results in the user experiencing changes of context and delays while documents are received. Web applications typically provide limited application functionality (e.g. no MDI type interface available) compared to traditional client-server native operating system applications (e.g. Windows executables).

Some web applications solve one or more of these problems using ActiveX controls or Java controls, but such applications are not acceptable in many environments due to security considerations. Also, frame based applications help overcome the frequent changes in context to some degree, but they still present a wait time as the frame page is reloaded from the server.

In view of such limitations, there is a need for further advancements in this area.

SUMMARY OF THE INVENTION

One form of the present invention is a unique browser-based application. Other forms include unique systems and methods to provide a zero-footprint browser-based user interface.

Another form includes operating a computer system that has several client workstations and servers, and accessing an application from a web browser that displays information in one or more content windows in a dashboard format.

Another form includes requesting that a browser-based application be retrieved from a server, the browser-based application requiring no web components to be installed before using the application other than a web browser. A single page is received from the server that contains code for a user interface for the application. The user interface is displayed to a user, and contains a plurality of content windows. When at least one piece of data needs to be retrieved from a data source, an asynchronous request is sent to the server for the at least one piece of data from a hidden frame in the page. The at least one piece of data is received from the server and used in the application.

Yet other forms, embodiments, objects, advantages, benefits, features, and aspects of the present invention will become apparent from the detailed description and drawings contained herein.

BRIEF DESCRIPTION OF THE DRAWINGS

FIG. 7 is a simulated screen of a dashboard user interface for a client computer of the system of FIG. 1.

DETAILED DESCRIPTION OF SELECTED EMBODIMENTS

Figure 1:
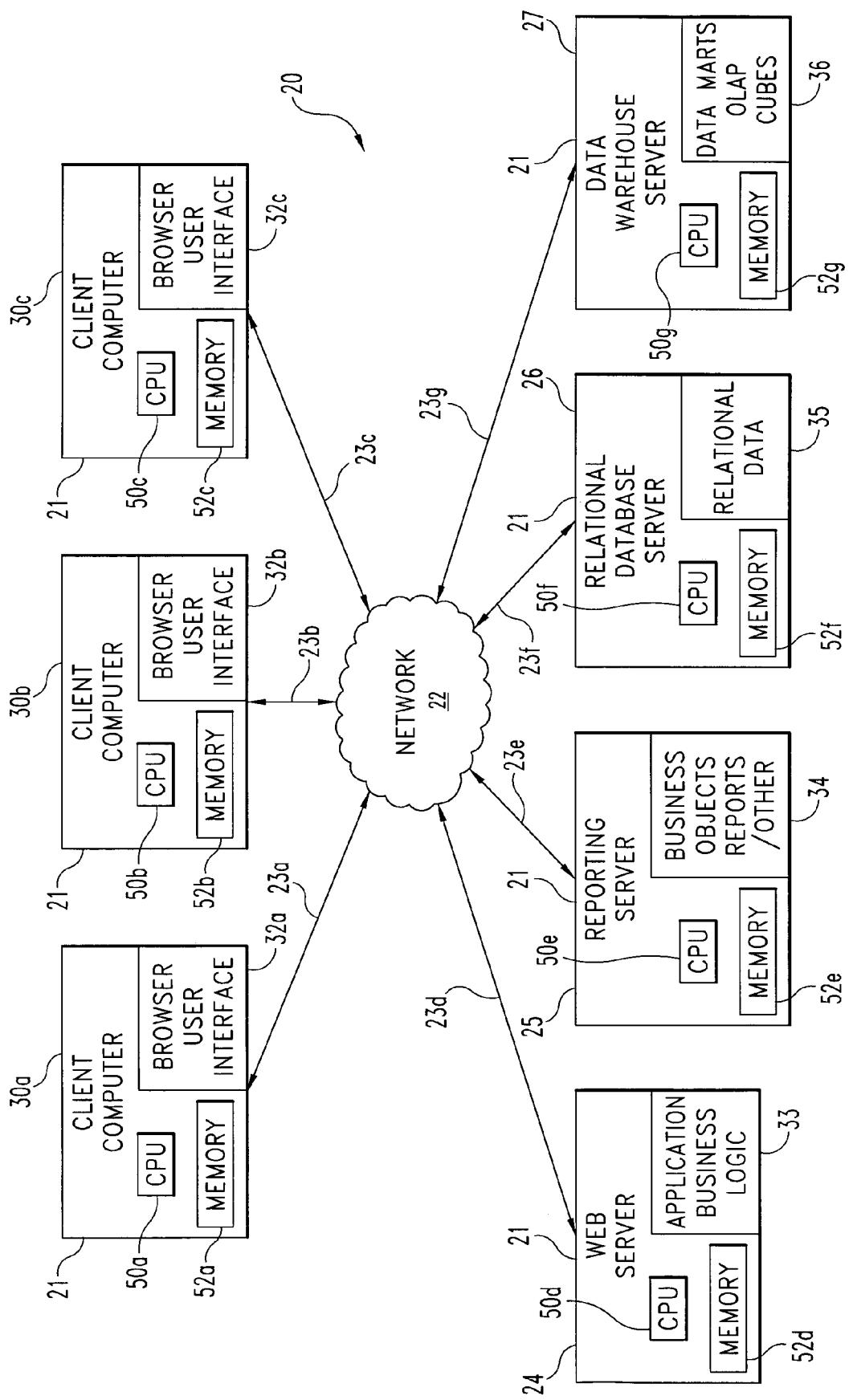
FIG. 1 is a diagrammatic view of a computer system of one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present invention includes a unique system for providing a browser-based user interface. FIG. 1 is a diagrammatic view of computer system 20 of one embodiment of the present invention. Computer system 20 includes computer network 22. Computer network 22 couples together a number of computers 21 over network pathways 23a-g. More specifically, system 20 includes several servers, namely Web Server 24, Reporting Server 25, Relational Database Server 26, and Data Warehouse Server 27. System 20 also includes client workstations 30a, 30b, and 30c (collectively 30). While computers 21 are each illustrated as being a server or client, it should be understood that any of computers 21 may be arranged to include both a client and server. Furthermore, it should be understood that while seven computers 21 are illustrated, more or fewer may be utilized in alternative embodiments.

Computers 21 include one or more processors or CPUs (50a, 50b, 50c, 50d, 50e, 50f, and 50g, respectively) and one or more types of memory (52a, 52b, 52c, 52d, 52e, 52f, and 52g, respectively). Each memory 52a, 52b, 52c, 52d, 52e, 52f, and 52g includes a removable memory device. Each processor may be comprised of one or more components configured as a single unit. Alternatively, when of a multi-component form, a processor may have one or more components located remotely relative to the others. One or more components of each processor may be of the electronic variety defining digital circuitry, analog circuitry, or both. In one embodiment, each processor is of a conventional, integrated circuit microprocessor arrangement, such as one or more PENTIUM III or PENTIUM 4 processors supplied by INTEL Corporation of 2200 Mission College Boulevard, Santa Clara, Calif. 95052, USA.

Each memory (removable or generic) is one form of computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

Although not shown to preserve clarity, in one embodiment each computer 21 is coupled to a display. Computers may be of the same type, or a heterogeneous combination of different computing devices. Likewise, displays may be of the same type, or a heterogeneous combination of different visual devices. Although again not shown to preserve clarity, each computer 21 may also include one or more operator input devices such as a keyboard, mouse, track ball, light pen, and/or microtelecommunicator, to name just a few representative examples. Also, besides display, one or more other output devices may be included such as loudspeaker(s) and/or a printer. Various display and input device arrangements are possible.

Computer network 22 can be in the form of a Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers 21 can be coupled together by computer network 22.

In one embodiment, system 20 operates at one or more physical locations where Web Server 24 is configured as a web server that hosts application business logic 33, Reporting Server 25 is configured as a reporting server for processing Business Objects® reports or other corporate reporting systems 34, Relational Database Server 26 is configured as a database server for storing relational data 35, Data Warehouse Server 27 is configured as a data warehouse server for storing warehouse data such as data marts or OLAP cubes 36, and client workstations 30a, 30b, and 30c are configured for providing a browser-based user interface 32a, 32b, and 32c, respectively. Typical applications of system 20 would include more or fewer client workstations of this type at one or more physical locations, but three have been illustrated in FIG. 1 to preserve clarity. Furthermore, although four servers are shown, it will be appreciated by those of ordinary skill in the art that the one or more features provided by Web Server 24, Reporting Server 25, Relational Database Server 26, and Data Warehouse Server 27 could be provided on the same computer or varying other arrangements of computers at one or more physical locations and still be within the spirit of the invention. Farms of dedicated servers could also be provided to support the specific features if desired.

As illustrated and described in greater detail hereinafter, the browser application of system 20 in a preferred embodiment is displayed to the user in a dashboard format with multiple content windows. The content windows can be displayed in varying arrangements. Alerts can visually indicate that certain criteria have been met. The user can customize the arrangement, size, content and layout of the content windows in the dashboard. As the user interacts with the application, calls to Web Server 24 are made asynchronously so the user can continue interacting with other aspects of the application while the data is being retrieved. A single page is used for the entire application and dynamically changes the display based on user selections. The page never changes to another page like you would find with typical web applications, and thus the browser application provides the look and feel that is more commonly found in a traditional client-server application.

Figure 2:
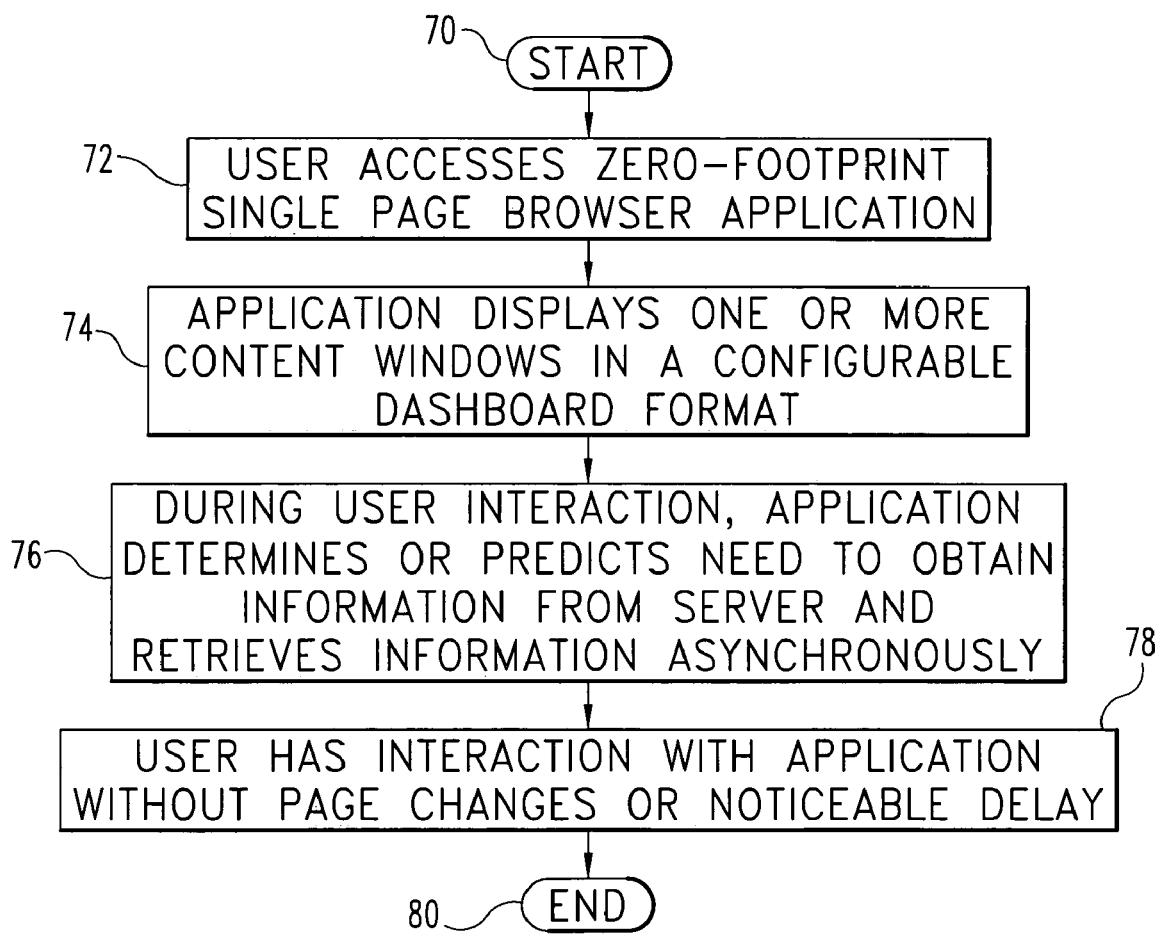
FIG. 2 is a high level process flow diagram for the system of FIG. 1 demonstrating the stages involved in providing a browser-based user interface.

Referring also to FIG. 2, one embodiment for implementing system 20 is illustrated in flow chart form as procedure 70, which demonstrates a high level process for providing the browser-based application. In one form, procedure 70 is at least partially implemented in the operating logic of system 20. Procedure 70 begins with a user accessing a zero-footprint single page browser application (stage 72) from client computer 30a over network 22. In a preferred embodiment, the single page is physically located on Web Server 24 and is transmitted to client computer 30a initially when accessed from a web browser on client computer 30a. No ActiveX components, Java components, or other web components are downloaded or used on client computer 30a by the browser application, providing a zero-footprint. Instead, the user interface presentation code is contained in the single page, and can include HTML, Dynamic HTML (DHTML), Active Server Pages (ASP), and/or Java Server Pages (JSP), as a few non-limiting examples. The user interface is generated dynamically and locally as the user interacts with the browser application. In one embodiment, many or all of the rich user interface features of the browser application are implemented using DHTML. The single page also contains code that calls remote scripts on Web Server 24 for application business logic 33.

The browser application has a user interface with one or more content windows that are displayed in a configurable dashboard format on client computer 30a (stage 74). As the user interacts with the browser application, the browser application determines or predicts a need to obtain information from a server and then calls remote scripts on Web Server 24 to retrieve the information asynchronously (stage 76). Because all communications with Web Server 24 are performed asynchronously and all results are returned to the single page browser application, the user is able to interact with the browser application without experiencing changes in web pages and without any noticeable or significant delay (stage 78).

Figure 3:
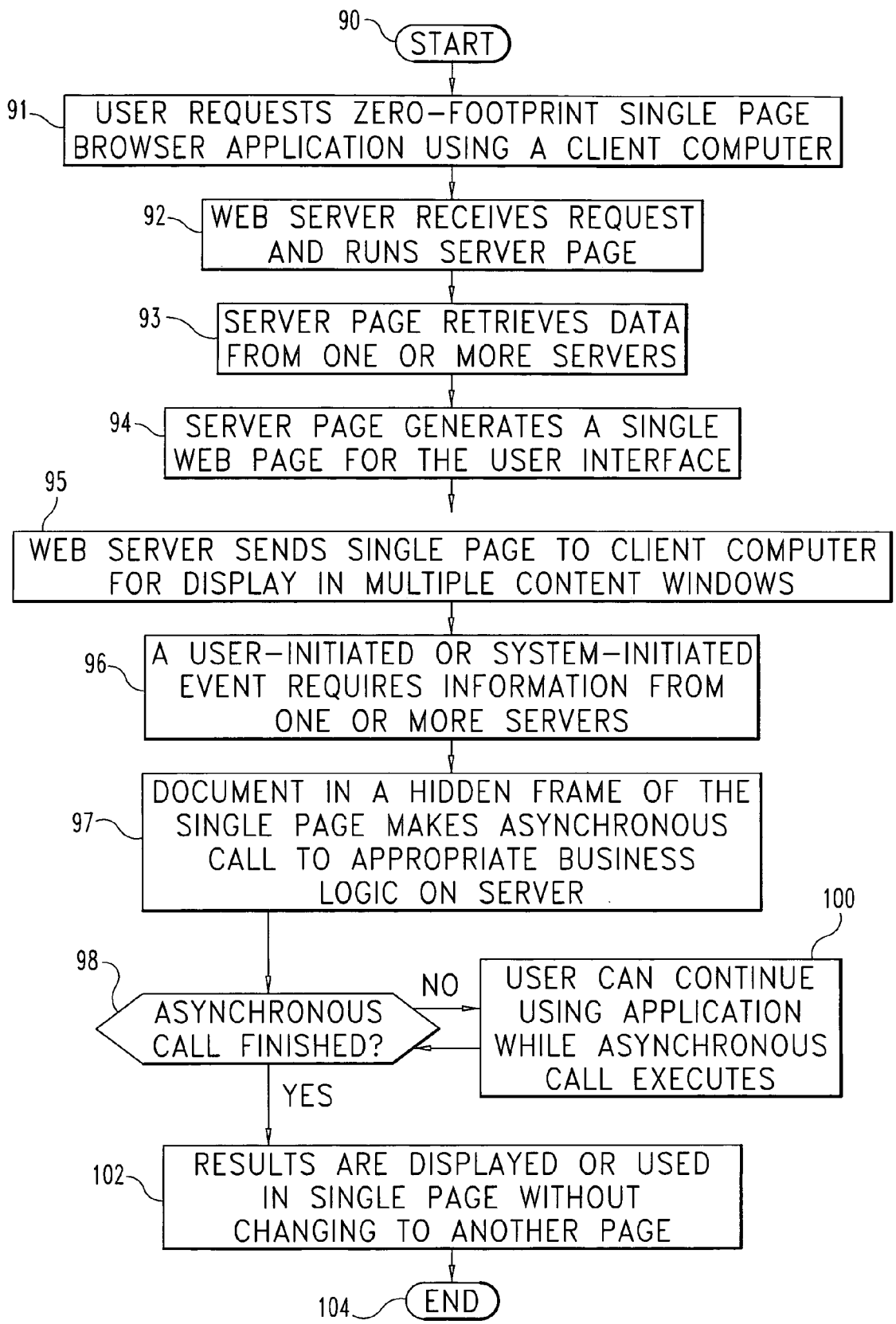
FIG. 3 is a process flow diagram for the system of FIG. 1 demonstrating the stages involved in using asynchronous calls for communications with one or more servers.

Referring also to FIG. 3, procedure 90 demonstrates the process for making asynchronous calls to Web Server 24 when needed. Procedure 90 begins with a user accessing a zero-footprint single page browser application (stage 91) from client computer 30a over network 22. Web Server receives the request from client computer 30a to access the browser application and runs the corresponding server page (stage 92). The Server page can be written in ASP, JSP, or another web programming language as would occur to one in the art. The server page retrieves data needed for one or more content windows in the application from one or more of the servers 24, 25, 26, or 27 (stage 93). The server page then generates a single web page that contains the code for rendering the user interface and that has code for making function/procedure calls to application business Logic 33 on Web Server 24 (stage 94). The single web page for the user interface can be generated in formats such as HTML, DHTML, and/or JavaScript, as a few non-limiting examples. Since the single web page will display multiple content windows to the user, one document is generated in the single page for each of the content windows. Web Server 24 then sends the single page to client computer 30a where the user interface can be displayed to the user with the multiple content windows (stage 95), such as a digital dashboard.

As the user interacts with the application, at some point a system or user-initiated event requires information to be obtained from one or more servers (stage 96). To retrieve information from one or more servers, a document in a hidden frame of the browser application on client computer 30a makes an asynchronous call to the appropriate application business logic 33 on Web Server 24 (stage 97). If the asynchronous call is not finished (stage 98), the user can continue interacting with the application while the call executes (stage 100). For example, the user can select other menu options and review other information while the asynchronous request to the server is pending. Upon executing the application business logic 33, Web Server 24 retrieves information from Reporting Server 25, Relational Database Server 26, and/or Data Warehouse Server 27 if necessary. Once the results are returned from Web Server 24 to client computer 30a, they are displayed or used in the browser application without changing to another page (stage 102).

Figure 4:
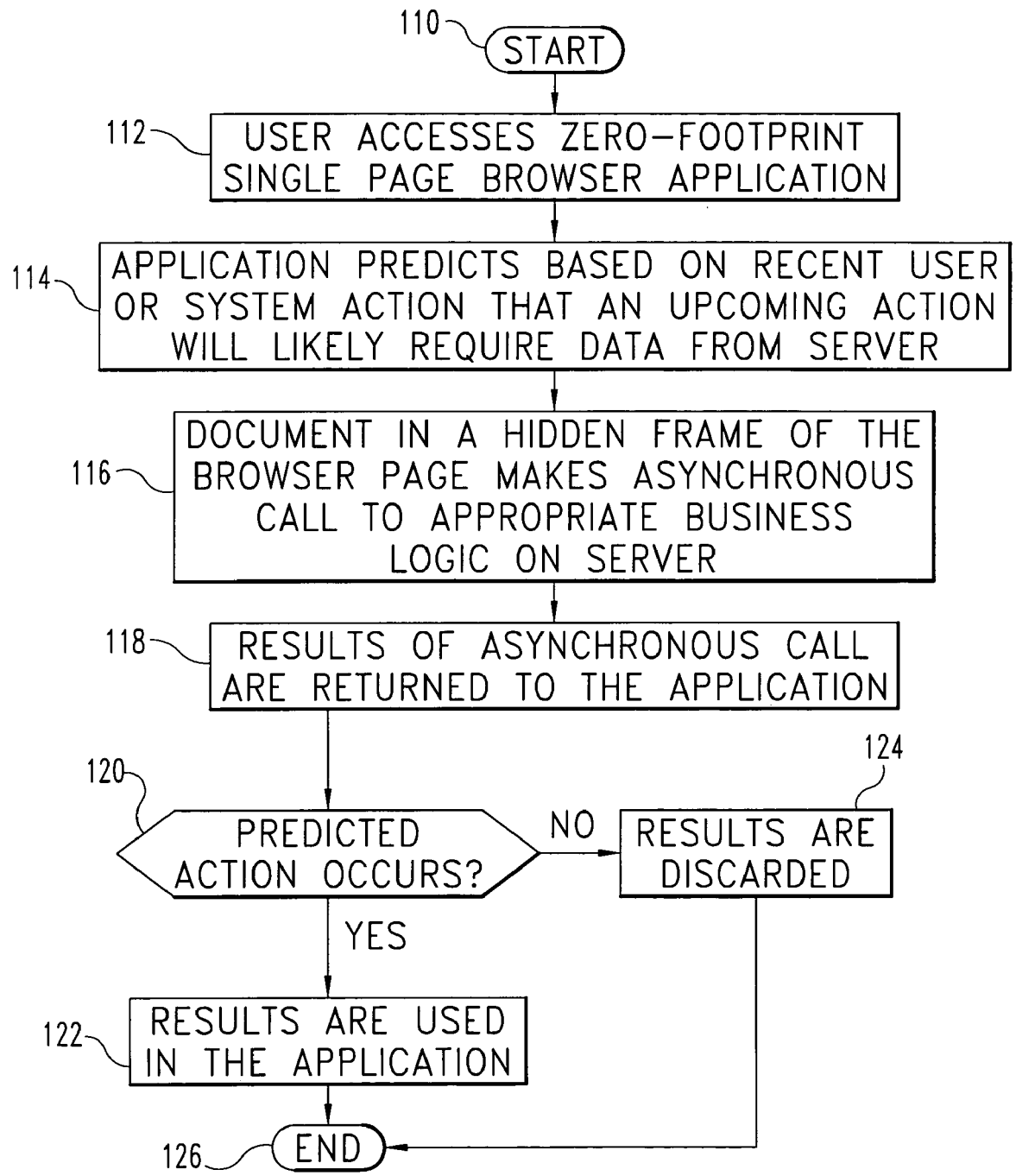
FIG. 4 is a process flow diagram for the system of FIG. 1 demonstrating the stages involved in predicting next actions and retrieving data according to the prediction.

Referring also to FIG. 4, procedure 110 demonstrates the process involved in predicting next actions and retrieving data from Web Server 24 according to the prediction. Procedure 110 begins with a user accessing a zero-footprint single page browser application (stage 112) from client computer 30a over network 22. The browser application predicts based on a recent user or system action that an upcoming action will likely require data from a server (stage 114). As one non-limiting example, if the user has selected an option to view a content window in an expanded view, the system might logically predict that a possible next action could include retrieving the complete detailed data behind the content window. The browser application can contain logic to predict one or more possible next actions. Once an event occurs for which a predicted next action is available, a document in a hidden frame of the browser application makes an asynchronous call to application business logic 33 on Web Server 24 (stage 116) to retrieve the data that will likely be required soon in the application. When the asynchronous call is finished executing, the results are returned to client computer 30a (stage 118). If the predicted next action actually occurs (stage 120), then the results are used appropriately in the application (stage 122), such as displayed in a content window to a user. If the predicted next action does not occur, then the results are discarded (stage 124).

Figure 5:
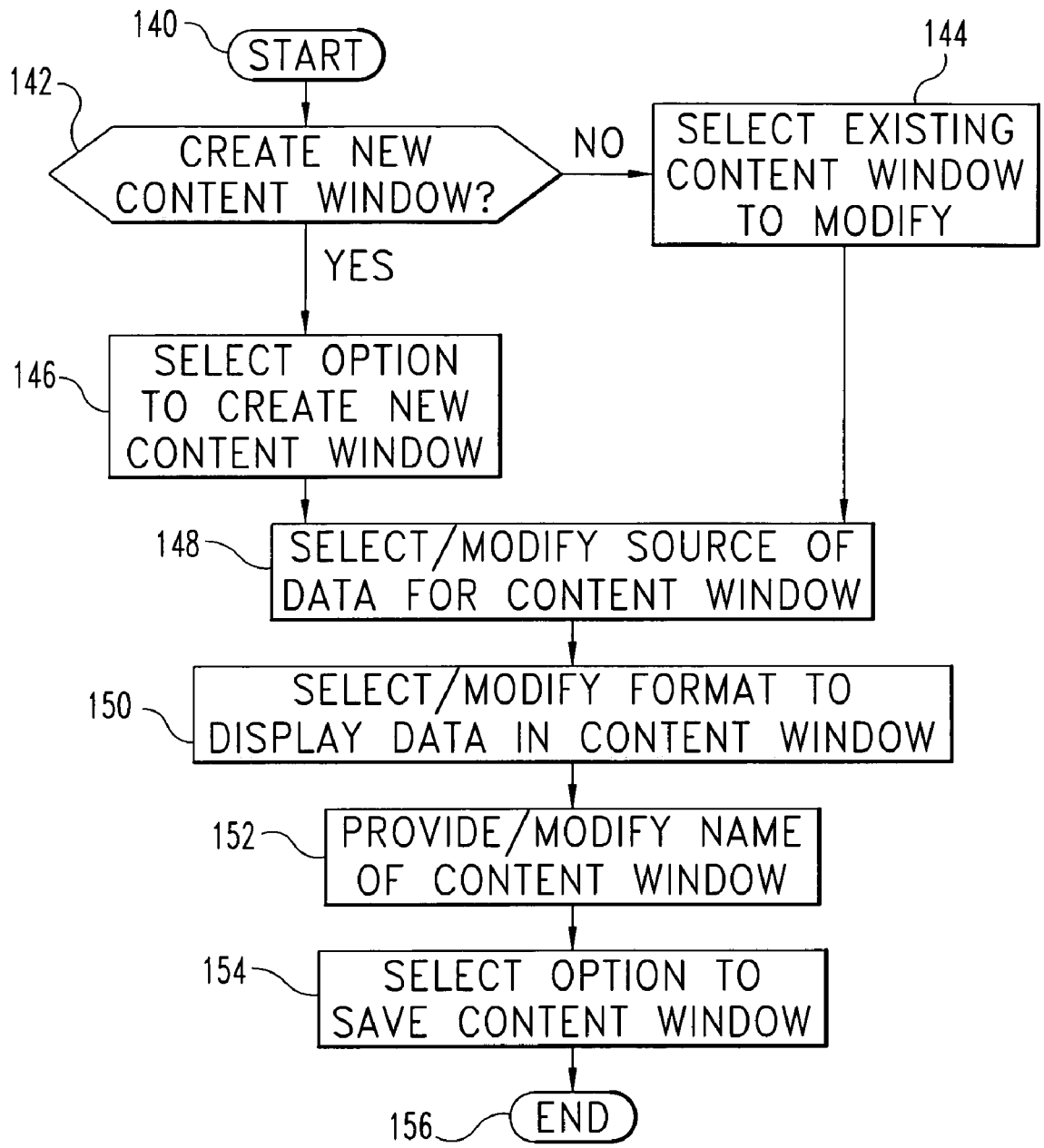
FIG. 5 is a process flow diagram for the system of FIG. 1 demonstrating the stages involved in creating and modifying content windows for a dashboard.
Figure 6:
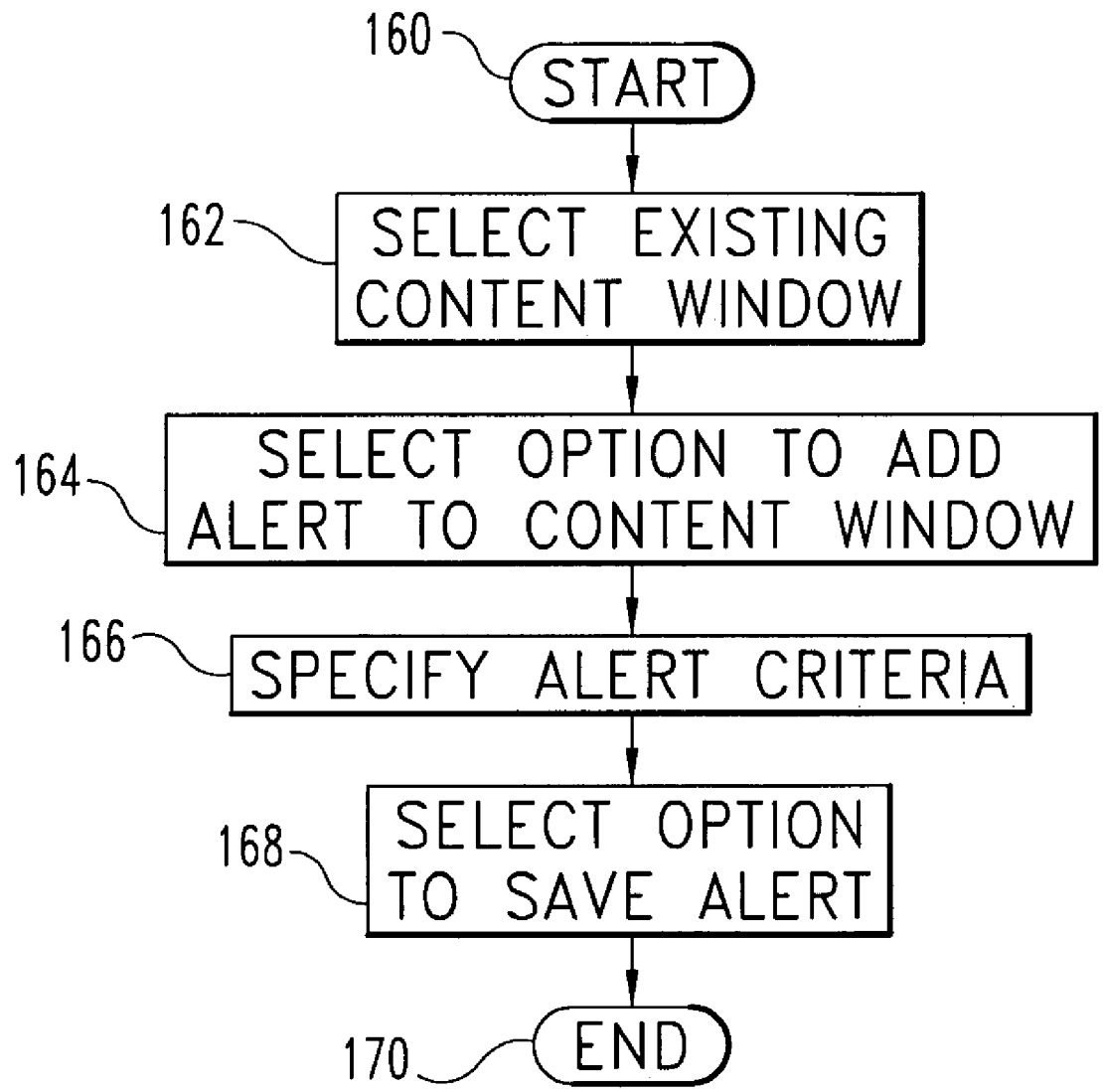
FIG. 6 is a process flow diagram for the system of FIG. 1 demonstrating the stages involved in creating and modifying alerts associated with content windows.

FIGS. 5 and 6 show some processes involved in specifying the type and manner in which data is displayed in the browser application on client computer 30a. Referring to FIG. 5, procedure 140 demonstrates the process involved in creating and modifying content windows for a dashboard. A user such as an administrator or an end user can customize the information that is displayed in each content window. If the user desires to create a new content window (stage 142), then he selects an option in the browser application to create a new content window (stage 146). If the user desires to modify an existing content window, he instead selects an existing content window to modify (stage 144). Whether creating a new content window or modifying an existing one, the user can select or modify the source of data for the content window (stage 148). As one non-limiting example, the user can select a report, query, table(s), field(s), SQL statement, Web Service, HTML page, URL, or other data source such as a file, database, or location from which the content for the window should be generated. The user can also select or modify the format in which the data should be displayed in the content window (stage 150). For example, the user can select whether to display the data in a table, graph, gauge, or list, if appropriate for the type of data selected. The user can provide or modify the name of the content window (stage 152) and can save the content window (stage 154).

Referring to FIG. 6, procedure 160 demonstrates the process involved in creating and modifying alerts or indicators associated with content windows. An alert can be added to a content window to visually and passively provide an indicator to a user that a particular event has occurred. As a few non-limiting examples, a passive alert might be illustrated by having text or images in a certain color, or by having some portion of text that flashes. Alerts can also be active, such that a sound or other notification more actively notifies the user. Alerts can indicate that a positive event has occurred, such as a sales goal reached, or alerts can indicate a negative event has occurred, such as sales reaching an all-time low, to name a few examples. To add an alert, the user selects an existing content window (stage 162) in the browser application and selects an option to add an alert to the selected content window (stage 164). The user then specifies the alert criteria to define how and when the alert should be displayed. The user selects an option to save the alert (stage 168). For example, a user may want to be quickly and easily be informed that sales are over projections or are under projections, as one non-limiting example. An indicator can be displayed in the content window to indicate that the event has occurred. In the previous example, a green indicator might be displayed to indicate that sales are over projection and a red indicator might be displayed to indicate that sales are below projection. One or more alerts with one or more alert conditions can be established for each content window to provide some identifying aspect of the data represented.

Figure 7:
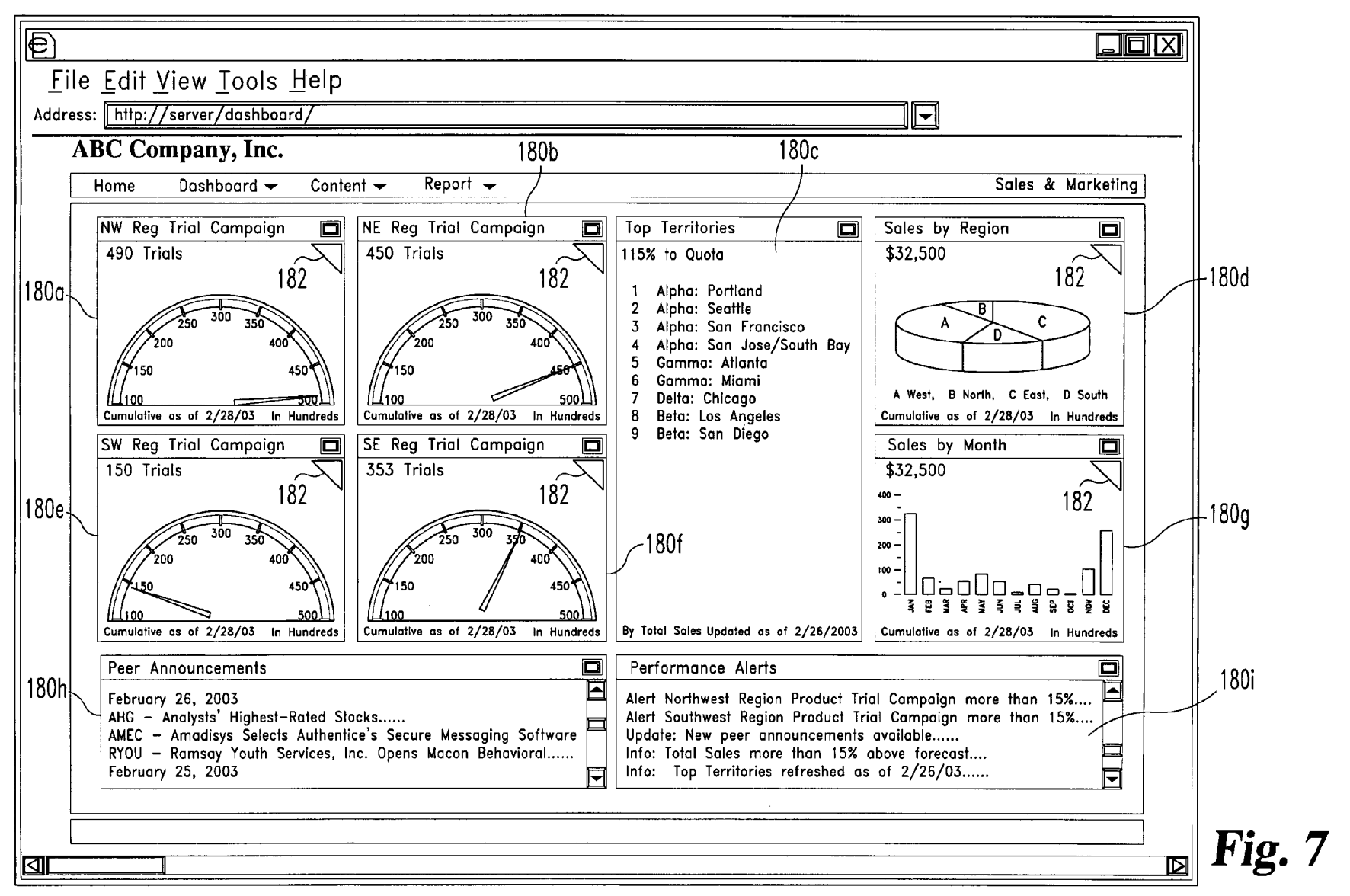

Turning now to FIG. 7, a simulated screen showing one implementation of the browser user interface on client computer 30a described in FIGS. 1-6 is illustrated. The user interface is portrayed in a dashboard format with multiple content windows 180a, 180b, 180c, 180d, 180e, 180f, 180g, 180h, and 180i displayed in varying arrangements. One or more content windows could be displayed. Alerts 182 visually indicate that certain criteria have been met, as described in further detail in FIG. 6. Content window 180i textually describes several alerts that have occurred. The user can customize the arrangement, size, content and layout of the content windows in the dashboard. As the user interacts with the application, all calls to Web Server 24 are made asynchronously so the user can continue interacting with other aspects of the application while the data is being retrieved. A single page is used for the entire application and is dynamically changed based on user selections. As described earlier, the page never changes to another page like you would find with typical web applications, and thus the browser application provides the look and feel that is more commonly found in a traditional client-server application.

A person of ordinary skill in the computer software art will recognize that the user interface features, including the window navigation style, mechanism for selecting options, screen content, and layouts could be organized differently to include fewer or additional options or features than as portrayed in the illustrations and still be within the spirit of the invention.

In one embodiment of the present invention, a method is disclosed comprising requesting that a browser-based application be retrieved from a server, said browser-based application requiring no web components to be installed before using the application other than a web browser; receiving a single page from the server that contains code for a user interface for the application; displaying the user interface to a user, said user interface containing a plurality of content windows; determining that at least one piece of data needs to be retrieved from a data source; from a hidden frame in the single page, sending an asynchronous request to the server for the at least one piece of data; receiving the at least one piece of data from the server; and using the at least one piece of data in the application.

In another embodiment of the present invention, a method is disclosed comprising receiving a request from a user to access a browser-based application, said browser-based application requiring no web components to be installed before using the application other than a web browser; determining that at least one piece of data needs to be displayed in the application; retrieving the at least one piece of data from at least one data source to include in the application; generating a single page that contains code for a user interface of the application; returning the single page to the browser so the user interface can be displayed to the user; receiving an asynchronous request for additional data from the single page; retrieving the additional data from a data source asynchronously so the user can continue interacting with the user interface while the additional data is being retrieved; and returning the additional data to the single page for use in the application.

In yet another embodiment of the present invention, a system is disclosed comprising a server computer; a client computer coupled to the server computer over a network; wherein the client computer is operable to send an initial request to the server for a browser-based user interface having multiple content windows, and to send to the server asynchronous requests for data as a user interacts with the user interface; and wherein the server computer is operable to receive the initial request from the client computer for the browser-based user interface, to generate the user interface into a single page, to send the single page user interface to the client computer, to receive the asynchronous requests for data, to use an application business logic to retrieve the asynchronously requested data from at least one data source, and to return the asynchronously requested data to the client computer.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

What is claimed is:

1. A method comprising:
   requesting that a browser-based application be retrieved from a server, said browser-based application requiring no web components to be installed before using the application other than a web browser;
   receiving a single web page from the server that contains code for a user interface for the application;
   displaying the user interface to a user, said user interface containing a plurality of content windows, wherein the user interface remains on said single web page and does not change pages as the user interacts with the application;
   determining that at least one piece of data needs to be retrieved from a data source;
   from a hidden frame in the single page, sending an asynchronous request to the server for the at least one piece of data;
   receiving the at least one piece of data from the server; and using the at least one piece of data in the application.

2. The method of claim 1, wherein the user can continue interacting with the user interface of the application while the asynchronous request for the at least one piece of data is pending.

3. The method of claim 1, wherein the request for the at least one piece of data is based on a specific action taken by the user that requires the at least one piece of data to be requested.

4. The method of claim 1, wherein the request for the at least one piece of data is based on a prediction of a future data that is likely to be needed and wherein the at least one piece of data is then only used in the application if needed.

5. The method of claim 1, wherein the user interface resembles a client-server application.

6. The method of claim 1, wherein the plurality of content windows have content displays that can be customized by a user.

7. The method of claim 1, wherein each of the plurality of content windows displays at least one piece of content that is selected from the group consisting of: a report, at least one database field, a web page, a word processing document, a result of a SQL statement, a content of a file, and a result of a web service.

8. The method of claim 7, wherein the at least one piece of content is displayed in a format selected from the group consisting of a table, a graph, a gauge, and a list.

9. The method of claim 1, wherein an alert can be defined for any of the plurality of content windows to indicate a particular event has occurred.

10. A method comprising:
    receiving a request from a user to access a browser-based application, said browser-based application requiring no web components to be installed before using the application other than a web browser;
    determining that at least one piece of data needs to be displayed in the application;
    retrieving the at least one piece of data from at least one data source to include in the application;
    generating a single web page that contains code for a user interface of the application, wherein the user interface remains on a single page and does not change pages as the user interacts with the application;
    returning the single page to the browser so the user interface can be displayed to the user;
    receiving an asynchronous request for additional data from the single page;
    retrieving the additional data from a data source asynchronously so the user can continue interacting with the user interface while the additional data is being retrieved; and
    returning the additional data to the single page for use in the application.

11. The method of claim 10, wherein the single page contains a plurality of documents for displaying each of a plurality of content windows to the user.

12. The method of claim 11, wherein each of the plurality of content windows displays at least one piece of content that is selected from the group consisting of: a report, at least one database field, a web page, a word processing document, a result of a SQL statement, a content of a file, and a result of a web service.

13. The method of claim 10, wherein the request for additional data is based on a specific action taken by the user that requires the additional data to be requested.

14. The method of claim 10, wherein the request for additional data is based on a prediction of future data that is likely to be needed.

15. The method of claim 10, wherein the user interface resembles a client-server application.

16. A system comprising:

a server computer;

a client computer coupled to the server computer over a network;

wherein the client computer has a browser-based user interface requiring no web components to be installed before using the user interface other than a web browser;

wherein the client computer is operable to send an initial request to the server for the browser-based user interface having multiple content windows, to allow the user to interact with the user interface on a single page and without changing to a different page, and to send to the server asynchronous requests for data as a user interacts with the user interface; and wherein the server computer is operable to receive the initial request from the client computer for the browser-based user interface, to generate the user interface into a single page, to send the single page user interface to the client computer, to receive the asynchronous requests for data, to use an application business logic to retrieve the asynchronously requested data from at least one data source, and to return the asynchronously requested data to the client computer.

17. The system of claim 16, wherein the server computer is further operable to generate the single page having a plurality of documents for displaying each of the multiple content windows.

18. The system of claim 16, wherein the at least one data source is selected from the group consisting of a reporting server, a relational database server, and a data warehouse server.

* * * * *